Aug. 13, 1929.  J. H. BARNES  1,724,168
GEAR CUTTING MACHINERY
Original Filed Dec. 4, 1924   2 Sheets-Sheet 1

Inventor
James H. Barnes
By Edward J. Noé Jr.
Attorney

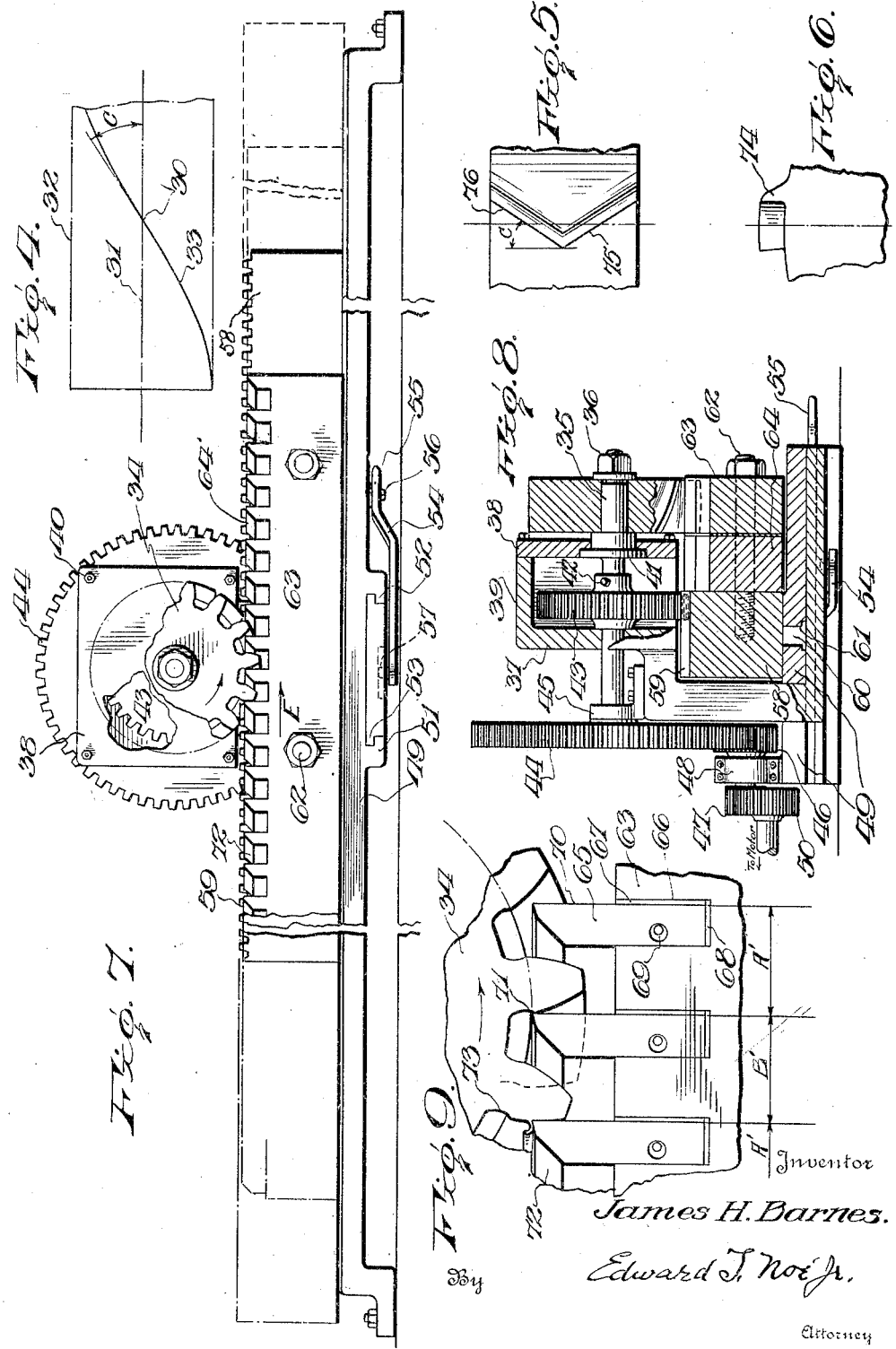

Patented Aug. 13, 1929.

1,724,168

UNITED STATES PATENT OFFICE.

JAMES H. BARNES, OF DAYTON, OHIO, ASSIGNOR TO DAYTON CURVOMETER PRODUCTS COMPANY, OF DAYTON, OHIO, A CORPORATION OF OHIO.

GEAR-CUTTING MACHINERY.

Application filed December 4, 1924, Serial No. 753,892. Renewed February 23, 1929.

This invention relates to gear cutting machinery and a primary object is the provision of a novel machine and method for cutting curved surfaces in the direction of roll of the surfaces.

Another object of the invention is the provision of a novel method and machine for cutting an involute or substantially involute working surface of a gear by rotational movement of the gear about a fixed axis in timed relation to a reciprocally removable edged cutting tool, which thus takes a continuous shave on the working surface from the tip to the root of a tooth.

More particularly my invention concerns a machine for cutting teeth on roughed gear blanks by means of a cutter having a series of cutting edges, each cutting edge adapted to take a continuous shave for the full length of one of the working surfaces of a tooth. The cutting edges are movable along a line which is tangential to the base circle of the finished gear, which is cut thereby, and each edge is in contact with the base circle of the finished gear at the point of tangency of the base circle and of the line in which the cutting edges move. The number of cutting edges upon the cutter exceeds the number of teeth upon the finished gear and the first group of these edges take preliminary shaves on one side of all of the teeth of the gear and the second group of edges act upon these working surfaces to take finishing cuts thereon. The finished gear cut revolves continuously about a fixed axis as the various surfaces are cut.

I am aware that it has been proposed to burnish gears by rolling involute gears together, but such a method has not been successful, due to the fact that there is no relative motion between two mating involute surfaces at the pitch circle lines of the surfaces. In the method which will be more fully set forth, in accordance with my invention, a continuous cut or shave is made on the working surfaces of gearing for the full length of the working surface, the shave being made in the direction of roll, or in other words in the direction of the involute in the case of involute gearing. My invention is susceptible to use in cutting spur, herring-bone and helical gears, racks and segments, as well as cutting the working surfaces on articles of a similar nature. A continuous shave of a substantial nature may be taken or the cut may be of a more shallow depth as a finishing operation.

The more detailed objects and advantages of my invention, and the mode of operation thereof will be more fully set forth in the enclosed specification, in the claims and in the drawings, in which Fig. 1 is a front elevation of a machine provided with a tool for cutting helical gears.

Fig. 4 is a detail for illustrating helical lines on a base cylinder having the diameter of the base circle of the finished gear cut.

Fig. 5 is a detail end-view of a herringbone cutter showing a single cutter.

Fig. 6 is a side view of Fig. 5.

Fig. 7 is a front elevation of a modification showing a rack form cutter in a machine for cutting helical gears.

Fig. 8 is a vertical side elevation of Fig. 7, parts being shown in section through the vertical center line of Fig. 7, and Fig. 9 is a fragmentary detail of the cutter and the helical gear cut thereby of Fig. 7.

Figure 1:
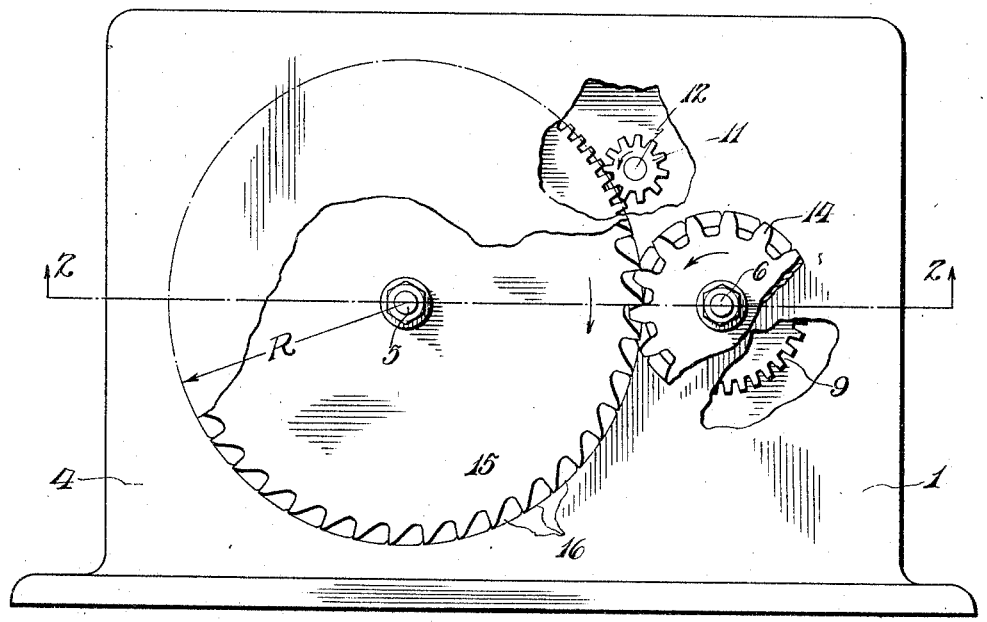
Figure 2:
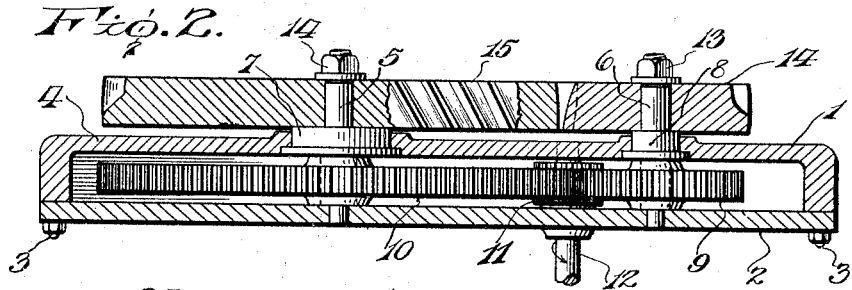
Fig. 2 is a horizontal section taken on the line 2—2 of Fig. 1.

Referring to the drawings by reference numerals and more particularly to Figs. 1 and 2, 1 indicates the main base support casting or housing which is provided with a back plate 2, securely fastened thereto by means of bolts 3. Mounted in the front plate 4 and the back plate 2 of the housing, are two parallel shafts 5 and 6, shaft 5 being mounted by means of an integral flange 7 in the front plate so as to be prevented from moving endwise therein. Suitable anti-friction bearings may, of course, be provided. A similar flange 8 is integral with the shaft 6. Rigid with the shaft 6 is a toothed member shown as the spur-gear 9 which is driven by a second toothed member shown as the spur-gear 10, fixed to the shaft 5. Gear 10 drives both the shaft 5 and the shaft 6 and is driven by a pinion 11 fixed on shaft 12 which is journaled in the front and rear plates of the housing and which may be driven by any suitable source of power such as an electric motor.

Fixed on the shaft 6 by means of a removable nut 13, which is threaded on the outer end of the shaft, is a roughed gear blank 14, and fixed to shaft 5 by means of a nut 14 threaded on the end thereof, is a cutter or tool 15 which is provided with a series of cutting edges 16. The pitch diameter of the gear 9 corresponds to the base circle diameter of the finished gear to be cut from the gear blank 14, so that the blank 14 and the cutter 15 rotate at the proper relative speed in conjunctive relation at the base circle of the finished gear 14. The gear 14 is driven counterclockwise and the cutter 15 clockwise at the same time by means of the pinion 11.

Figure 3:
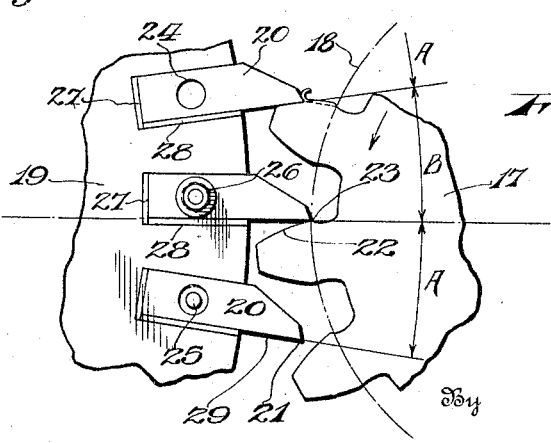
Fig. 3 is a fragmentary detail view of a spur gear and a cutter for cutting the same.

In Fig. 3, the roughed gear blank 17, is shown having a base circle 18. A revolving tool 19 therefor, is provided with a series of cutters 20, the cutters adapted to cut spur teeth upon the gear blank. Each wedge-shaped edge 21 of the cutter is adapted to move in a circular path about the axis of the tool 19, so that the cutting edges 21 are in contact with the working surfaces 22 at the base circle 18. The line corresponding to the path through which the cutting edges move is tangential to the base circle 18 at the point 23, corresponding to the limit of movement of the tool along the working surface 22. With the relative positioning of the cutting edges and the base circle line of the finished gear cut, it will be found that an approximate or substantially involute surface will be shaved on the working surfaces thereof. The cutter will cause a continuous shave to be made from the outer tip of the tooth to the base line thereof in the direction of roll, or in other words in the direction of the involute. The different cutters 20 are removably mounted upon the main part of the tool 19, the cutters being shown as provided with a hole 24, through which extends a bolt 25 provided with a hexagonal head 26, the bolt 25 being adapted to thread into the rear portion of the main part of the tool 19 and being of smaller size than the hole 24 so as to permit slight adjustments of the tool 20. Shims 27 and 28 may be provided to fixedly mount the cutters 20 in the tool. The line 29 of the cutter 20 extends in a radial direction so that the cutters may be sharpened as desired and the shims 27 increased in thickness to properly position the cutting edges 21. The number of cutting edges upon the tools shown in Fig. 1 and Fig. 3, is preferably three times the number of teeth upon the roughed gear blank and the cutting edges 21 are so positioned that the first group of cutting edges of the tool, corresponding in number to the number of teeth upon the roughed gear blank, take preliminary shaves on one side of all of the teeth of the gear blank. Each of the cutters in this group are positioned so that the angular distance A in Fig. 3 is constant for this group. The second group of cutting edges is likewise positioned so that the cutting edges are likewise spaced in accordance with the spacing of the first group, but the distance between the last tool of the first group shown in the center of Fig. 3 and the first cutter of the second group, is a distance B which is slightly smaller than distance A so that the second group of cutters all take a second shave of a substantial depth for the full length of the working surfaces. The third group of cutters would then operate upon the gear so as to take finishing shaves as the gear makes its third revolution.

When a revolving cutter is used for cutting helical gears as in Fig. 1, the cutting edges of the tool are slightly curved and this curve is a helix. Every point in the edges of all of the cutters is spaced the same constant distance from the center of the shaft 5 so that all of the points in the cutters will contact with the base cylinder of the finished helical gear 14. The angle C is the angle of the base helix or in other words is an instantaneous angle at the point 30 of Fig. 4 between the axis 31 of the base cylinder 32 of the finished gear cut and the path of the helix 33 which is shown traveling around the base cylinder. Regardless of the size of the cutter the angle of the helix at the base circle of the gear cut is equal to the angle of the helix of the edges of the cutters, the helix of the cutter being described about a cylinder having a radius R containing all of the cutting edges. It will be understood how the line of the helical cutting edge describes a helical working surface on the gear 14, if the gear 14 is considered as made up of a number of disks of infinitesimal thickness, each disk being cut in the manner as shown in Fig. 3. It has been found that the surface which is shaved by the finishing cut in the embodiment of my invention is an approximate or substantially helical involute surface and every point in this surface is cut in the direction of roll of the surface.

In the modification shown in Figs. 7 and 8, the roughed gear blank 34 of the helical type is fastened to the shaft 35 by means of the removable nut 36, threaded on the end of the shaft. Shaft 35 is mounted in the back end 37 and in the front plate 38 of the movable housing 39, which is adapted to periodically move forwardly and rearwardly in a manner to be more fully described. Front plate 38 is firmly attached to the housing 39 by means of bolts 40. The shaft 35 is provided with an integral flanged enlarged portion 41 to fix the shaft against endwise movement in the housing. Mounted rigidly upon the shaft 35 by means of a set screw 42, is a gear 43 and a second gear 44 of larger size is fixed on the rear end of the shaft 35. A journal 45 is fixed to the rear of the movable housing 39 so as to support the rear of the shaft 35.

Gear 44 is driven in a counter-clockwise direction by a pinion 46 which is driven by means of a second pinion 47 fixed to the same shaft which is suitably journaled at 48 on the rear of a base fixed support 49. Pinion 47 gears with pinion 50 which is driven from a suitable source of power so as to rotate continuously in one direction. It will be understood that as the housing 39 moves rearwardly or to the left from the position shown in Fig. 8, gear 44 will be moved out of engagement with pinion 46 and will engage pinion 50 so as to reverse the direction of the gear 44. The housing 39 is provided with two lower sills 53 extending forwardly and rearwardly which operate in guides 51 and 52 on the main base 49. A bell crank lever having arms 54 and 55 is pivoted on a vertical axis at 56 and the end of the arm 54 is provided with a vertically projecting pin 57 in a transverse slot in the bottom of the movable housing. Arm 55 forms a handle which may be movable laterally either by hand or automatically so as to move the housing 39. Mounted upon the support 49, so as to be capable of lateral movement in the direction of the arrow E, is a rack 58 provided with upper rack teeth 59, adapted to mesh with the teeth of the gear 43 so as to engage therewith at all times regardless of the position of the movable housing. The pitch diameter of gear 43 equals the base circle diameter of the finished gear cut so that the cutter will move at the proper speed. The rack 58 is guided upon the support 49 by guides 60, engaging with a groove 61 in the support. Suitable anti-friction devices may be employed between the lower surface of the rack 58 and the surface of the support 49, on which it moves. Rigidly fixed to the rack 58, by means of a series of bolts 62, is a tool 63 provided with a series of cutting edges 64' which are adapted to cut working surfaces on one side of the teeth of the gear blank, as the tool 63 moves in the direction of the arrow E. The second tool 64 is also mounted so as to be movable with the rack 58 and tool 63 and is mounted adjacent to and in back of the tool 63 so that when the housing 39 is in its rear position, the tool 64 will cut a working surface on the other side of the gear teeth of gear 34, as the rack and tools move opposite to the direction of arrow E. It will be clear that the gear 44 is alternately driven first in one direction and then in the other, so as to engage with one or the other of the pinions 46 and 50 as the housing is moved back and forth by means of the hand lever 55. The rotation of the gear 44 drives both the gear 43 and the gear blank 34, the rack 58 causing the tools to move lengthwise until the tool in engagement with the gear blank has reached the end of its movement and moved out of engagement with the gear blank. The hand lever 55 is then operated to reverse the direction of rotation of the gear blank and to move the housing 39 and the shaft 35 supported thereby rearwardly or forwardly so that the second tool will move so as to engage the gear blank. The dotted line positions at the ends of the tool 63 in Fig. 7 show the limits of movement of the tools and the rack. The rack 58 is necessarily made longer than the tools so as to engage with the gear 43 at all times.

Each cutter 65 of the tool 63 may be adjustably mounted in slots 66 in the main body of the tool by means of the shims 67 and 68 and bolts engaging with bolt holes 69 in the main body of the tool, the surfaces 70 of the cutters 65 extending vertically and at an angle C to the shaft axis of the gear 34. This angle C, as shown in Fig. 4, is an angle at the point 30 between the axis 31 of the base cylinder 32 and the helix 33 which is shown traveling around the base cylinder. The top edges of all of the cutters 65, all lie in the same horizontal plane which is tangent to the base cylinder of the gear 34, and the cutting edge is adapted to engage the working surfaces of a tooth at the base line at the point 71 where it is traveling tangentially to the base cylinder. In Fig. 9, a preliminary shave has been nearly completed upon the middle tooth of the gear 34, the inner rear portions of the tooth being cut as the various points in the rear portion of the cutter later contact therewith, as the gears revolve and the cutter travels to the right. A finishing shave is partially completed on the left hand tooth of this figure by the cutter 72, it being understood that the gear has made approximately one complete revolution and one side of all the surfaces of the teeth has had two preliminary shaves made thereon. The number of teeth in the cutter 63 is preferably made three times the number of the teeth on the gear 34, so that two preliminary shaves may be made before the final finishing shave is taken. It will be understood that the distance B' between cutter 72 and the adjacent cutter in the second group of cutters, is slightly smaller than the distance A', between the cutters in any one group. The cutting edges 64' for example, as shown in Figs. 7 to 9 are perfectly straight yet they are capable, due to the manner in which the parts move, of taking a perfect helical involute cut in the direction of roll of the working surface. The cuts made are continuous for the full length of the working surface and every point in the working surface of the finished gear is cut in the direction of the involute, thus avoiding the minute ridges which cause excessive noise in gears which have been hobbed or which are shaped by a series of cuts taken transversely along the teeth.

In all of the examples which have been mentioned, the roughed gear blank is made by hobbing, or by any other desired method, and is preferably provided with an undercut root portion 73 so that the distance between the working surfaces of the tooth at the base circle of the roughed gear blank will correspond to the final distance at this point after the gear has been shaved. By this method the shave is stopped at the base circles where the shaving will fall off. The cuts which are made by the preliminary cuts may or may not be substantially involute since the tool has been slightly displaced to enable the preliminary cut to be taken, but the final shaves taken are substantially involutes, if the cutting edges of the finishing cutters contact with the base cylinder and contact with the finished working surface on the tooth at the exact point of tangency of the base circle.

Herring-bone gears may be cut by either revolving the cutter as shown in Fig. 1 or by the reciprocating tool as shown in Fig. 7, by constructing the cutter as shown in Fig. 5 in which the angle C corresponds to the angle C Fig. 4. Fig. 6 shows a herring-bone tool provided with a single cutter 74 adapted to be rotatably mounted in the same manner as the construction shown in Fig. 1, the cutter 74 having two angularly related cutting edges 75 and 76, which simultaneously operate upon the blank, it being understood, of course, that the blank has been first roughed in any suitable manner to form a roughed herring-bone gear. The cutting edges 75 and 76 are slightly curved for the same reasons as set forth in detail in the description of the cutter shown in Fig. 1, it being of course obvious that the cutter may be considered as merely composed of a plurality of single helical cutters.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In a machine for cutting involute surfaces, in combination, supporting means, means on said support for holding a blank to be provided with a working surface, a wedge-shaped shaving tool, means on said support for holding said tool, and mechanism for moving two of said means in relatively timed relation while the third is maintained stationary so that said tool takes a continuous shave in the direction of roll of said surface to provide a working surface of a substantial length on said blank.

2. In a machine of the class described, in combination, supporting means, means on said support for holding a blank to be provided with a substantially involute working surface, a wedged-shaped shaving tool, means on said support for holding said tool, and mechanism for moving two of said means in relatively timed relation, so that said tool shaves a substantially involute working surface on said blank, said shave being made continuously for the full length of said working surface and in the direction of the involute.

3. In a machine of the class described, in combination, supporting means, means for holding a roughed gear blank therein, a cutting tool having a series of wedge shaped cutting edges, means for holding said tool, and mechanism for moving two of said means while the third is maintained stationary, so that said edges successively operate on said gear blank to shave working surfaces thereon, so that each shave is continuous and made substantially in the direction of roll of the surface and for the full length of said working surface.

4. In a machine of the class described, in combination, supporting means, means for holding a roughed gear blank therein, a cutting tool having a series of wedge shaped cutting edges, means for holding said tool, and mechanism for moving both said gear blank and said tool so that said edges successively operate on said gear blank to shave working surfaces thereon so that each shave is made from the tip towards the root of the tooth in a single continuous cut and for substantially the full length of the working surface.

5. In a gear cutting machine, in combination, a support, means for holding a roughed gear blank on said support, a tool having a wedge shaped cutting edge, tool holding means on said support, and mechanism for relatively moving said means, the said edge being positioned in relation to the blank so that a point in said edge contacts with a tooth surface on the gear cut, at the base line of the finished gear for a single instant while traveling tangentially to said base line to continuously shave a working surface on said gear.

6. In a gear cutting machine, in combination, a support, means for holding a roughed gear blank on said support, a tool having a cutting edge thereon mounted on said support, a toothed member movable with said roughed gear blank, another toothed member intermeshing with said first toothed member and movable with said tool, and a device for moving one of said toothed members for the purpose described, the relative proportions of said toothed member being such that said cutting edge moves in a path which is tangential to the base line of the gear cut and in contact with a surface of the gear at said base line.

7. In a machine of the class described, in combination, a support, means for holding a roughed toothed blank therein, a cutting tool having a series of similar cutting edges thereon, means for holding said tool and mechanism for relatively moving said means so that a group of said edges take preliminary cuts on the working surfaces of the blank to cut substantially involute surfaces thereon, and a second group of said edges subsequently operate on the same surfaces to continuously cut substantially involute surfaces thereon, each cutting edge acting on a tooth continuously from the tip to the root of the tooth, substantially in the direction of roll of the surfaces.

8. In a machine of the class described, in combination, a support, means for holding a roughed toothed blank therein, a cutting tool having a series of similar cutting edges thereon, means for holding said tool, mechanism for relatively moving said means so that said edges engage said blank to take continuous shaves for substantially the full length of the working surfaces of the teeth of the blank and substantially in the direction of roll of the surfaces, the edges of said tool being relatively spaced so that one of said edges takes a preliminary shave and a second edge takes a final finishing shave on the same working surface.

9. In a machine of the class described, in combination, a support, means for holding a roughed toothed blank therein, a cutting tool having a series of cutting edges each of which is so spaced and positioned as to take continuous shaves for substantially the full length of the working surfaces of the teeth of the blank substantially in the direction of roll of the surfaces, means for holding said tool, mechanism for relatively moving said means so that said edges engage said blank, the edges of said tool being relatively spaced so that one of said edges takes a preliminary shave and a second edge takes a final finishing shave on the same working surface, said mechanism comprising a toothed member attached directly to said tool holding means and a toothed member intermeshing directly therewith and attached directly to said blank holding means.

10. In a machine of the class described, in combination, a support, means for holding a roughed toothed blank therein, a cutting tool having a series of cutting edges thereon, means for holding said tool, mechanism for relatively moving said means so that said edges engage said blank to take continuous shaves for substantially the full length of the working surfaces of the teeth of the blank and substantially in the direction of roll of the surfaces, the edges of said tool being relatively spaced so that one of said edges takes a preliminary shave and a second edge takes a final finishing shave on the same working surface, and said second edge moving in a path which is tangential to the base line of finished blank and in contact with a working surface of the finished blank at said base line.

11. In a machine of the class described, in combination, a support, means for holding a roughed toothed blank therein, a cutting tool having a series of cutting edges thereon, means for holding said tool, mechanism for relatively moving said means so that said edges engage said blank to take continuous shaves for substantially the full length of the working surfaces of the teeth of the blank and substantially in the direction of roll of the surfaces, the edges of said tool being relatively spaced so that one group of said edges take preliminary shaves and a second group take final finishing substantially involute shaves on the working surfaces, each cutting edge of said second group being positioned so as to contact with the base line of the finished blank while in contact with the finished involute surface thereof.

12. In a machine of the class described, in combination, a support, means for holding a gear blank in said support, a cutting tool having a series of cutting edges, means for holding said tool on said support, and mechanism for relatively moving said means continuously in one direction to cut one working surface of each of the teeth of said blank, the cutting edges being maintained relatively positioned in relation to the teeth of the blank so that each cutting edge makes a cut which is continuous for the full length of the working surface and in the direction of roll of the surface.

13. In a machine of the class described, in combination, a support, means for holding a gear blank in said support, a cutting tool having a series of cutting edges, means for holding said tool on said support so that the edges of the tool contact with the base line of the finished gear cut while in contact with a working surface thereof, and mechanism for relatively moving said means continuously in one direction to cut one working surface of each of the teeth of said blank, each cut being continuous for the full length of the working surface and in the direction of roll of the surface.

14. In a machine of the class described, in combination, a support, means for holding a roughed toothed blank therein, a cutting tool having a series of cutting edges thereon, means for holding said tool, mechanism for relatively moving said means, said edges being located and positioned so that they engage said blank to take continuous shaves for substantially the full length of the working surfaces of the teeth of the blank and substantially in the direction of roll of the surfaces, the edges of said tool being relatively spaced so that one of said edges takes a preliminary shave and a second edge takes a final finishing shave on the same working surface, and said second edge moving in a path which is tangential to the base line of finished blank and in contact with a working surface of the finished blank at said base line, said mechanism comprising a toothed member attached directly to said tool holding means and a toothed member intermeshing directly therewith and attached directly to said blank holding means.

15. In a machine of the class described, in combination, supporting means, means for holding a roughed gear blank therein, a cutting tool having a series of wedge shaped cutting edges, means for holding said tool, and mechanism for moving two of said means while the third is maintained stationary, so that said edges successively operate on said gear blank to shave working surfaces thereon, so that each shave is continuous and made substantially in the direction of the involute and for the full length of said working surface, and means for adjusting said edges outwardly on said tool.

16. In a machine of the class described in combination, a support, means on said support for holding a gear blank, a cutting tool having a body portion and a series of similar evenly spaced edged cutters, means for adjusting said cutters individually in said body portion, said cutter being adapted to take a shave on the working surface of the gear, and mechanism for moving said gear blank and tool to cut working surfaces on said gear blank.

17. The method of cutting gear teeth comprising simultaneously moving a cutting tool and a gear blank so that successive continuous shaves are made on the gear blank, each shave being continuous from the tip to the root of a working surface thereof.

18. The method of cutting a working surface of a gear tooth comprising rotating the gear about its central axis and simultaneously moving an edged tool in a timed relation with the motion of the said working surface, so that a continuous finishing shave is made on the gear tooth from the tip to the root of the tooth.

19. The method of finishing an involute working surface of a gear tooth which comprises moving the gear about its central axis and simultaneously moving an edged tool in a rectilinear path in timed relation to the rotational movement of the gear so that the tool edge makes a continuous finishing shave on the gear tooth from the tip to the root of the tooth.

20. A gear finishing machine comprising, in combination, a base, a gear supporting spindle rotatably mounted on a fixed axis on said base, a reciprocable slide member, a driving interconnection between said slide member and said spindle adapted to move the slide member and the spindle in relatively timed relation, and a cutter on said slide member having a cutting edge movable tangentially to the base circle of the gear on the spindle while in contact with the working surface thereof and adapted to make a continuous shave from the tip to the root of a tooth of said gear.

21. A gear finishing machine comprising in combination, a base, a gear supporting spindle rotatably mounted on a fixed axis thereon, a rotatable cutter rotatably mounted on a fixed axis on said base, a driving interconnection between said cutter and said spindle adapted to move the cutter and the spindle in relatively timed relation, said cutter having a cutting edge movable tangentially to the base circle of a gear on the spindle while in contact with the working surface thereof at its base line so as to make a continuous shave from the tip to the root of a tooth of said gear.

In testimony whereof I have hereunto set my hand this 2nd day of December 1924.

JAMES H. BARNES.